(12) United States Patent
Wang et al.

(10) Patent No.: US 10,827,871 B2
(45) Date of Patent: Nov. 10, 2020

(54) SAFETY LID FOR A PRESSURE COOKER (71) Applicant: Instant Brands Inc., Ottawa (CA)

(72) Inventors: Dongjun Wang, Ottawa (CA); Jiwei R. Wang, Ottawa (CA); Yi Qin, Ottawa (CA)

(73) Assignee: Instant Brands Inc., Ottawa (CA)

( * ) Notice: Subject to any disclaimer, the term of this patent is extended or adjusted under 35 U.S.C. 154(b) by 0 days.

(21) Appl. No.: 16/194,616

(22) Filed: Nov. 19, 2018

(65) Prior Publication Data
US 2019/0167028 A1  Jun. 6, 2019

(30) Foreign Application Priority Data

Dec. 6, 2017 (CA) ..................... 2987776

(51) Int. Cl.
*A47J 27/09* (2006.01)
*A47J 36/06* (2006.01)

(52) U.S. Cl.
CPC ............... *A47J 27/09* (2013.01); *A47J 36/06* (2013.01)

(58) Field of Classification Search
CPC ................................. A47J 27/09; A47J 36/06
USPC .................. 220/573.1, 378; 99/330
See application file for complete search history.

(56) References Cited

U.S. PATENT DOCUMENTS

| | | | | |
|---|---|---|---|---|
| 2,622,591 A | * | 12/1952 | Bramberry, Jr. | ........ A47J 36/20 126/381.1 |
| 2,652,170 A | * | 9/1953 | Lotter | ................... A47J 27/092 220/290 |
| 2,772,806 A | * | 12/1956 | Theophil Pfeffer | .. A47J 27/092 220/326 |
| 5,839,357 A | * | 11/1998 | Ha | ...................... A47J 27/0813 99/337 |
| 7,690,526 B1 | * | 4/2010 | Hoff | ..................... B65D 39/084 220/254.8 |

\* cited by examiner

*Primary Examiner* — James N Smalley
(74) *Attorney, Agent, or Firm* — Daniel J. Chalker; Edwin S. Flores; Chalker Flores, LLP (57) ABSTRACT

A safety lid is provided for an electric pressure cooker. The electric pressure cooker comprises a housing, an outer pot received in the housing, and an inner pot removably disposed within the outer pot. The safety lid includes a lid body for covering the inner pot, an inner rim extending from the lid body for lockably engaging with an upper rim of the outer pot, and an outer rim extending from the lid body and being substantially concentric with the inner rim. The inner rim and the outer rim of the safety lid are spaced apart to define an annular groove for receiving an upper rim of the housing. An electric pressure-cooking appliance equipped with the safety lid is also provided.

15 Claims, 8 Drawing Sheets

SAFETY LID FOR A PRESSURE COOKER

CROSS REFERENCE TO RELATED APPLICATIONS

This patent application is a non-provisional patent application of Canadian patent application 2,987,776 filed on Dec. 6, 2017 and entitled "Safety Lid for a Pressure Cooker", which is hereby incorporated by reference in its entirety.

FIELD OF THE INVENTION

The present invention relates generally to a lid for a cooking appliance, and more specifically to a safety lid for an electric pressure cooker.

BACKGROUND OF THE INVENTION

Electric pressure cookers are known. However, the safety features provided by the commercially existing electric pressure cookers can be inadequate or unsatisfactory in certain situations. For example, due to undetected defects in some components of pressure cooker, such as gasket leakage or imperfection, release valve blockage, and/or improper operation or lack of maintenance of those components and/or the cooker, sudden bursts of high pressure, high temperature steam and/or liquid may emit from the pressure cooker, often radiating radially about a vertical central axis of the pressure cooker. These hazardous bursts may cause serious injuries to nearby people or animals.

Another drawback of the existing electric pressure cooker design is that when the cooking pressure reaches or exceeds a safety threshold, the excess steam/liquid is directed into one or more internal chambers of the cooker in order to avoid potential explosion or the aforementioned dangerous outbursts. However, when such events occur, the electronic components and control circuitry located in the internal chambers will be completely destroyed by the released steam/liquid, ruining the entire cooker.

Despite many attempts made by the industry at improving the sealing and pressure releasing mechanisms of electric pressure cookers, the above noted problems still persist in the prior art electric pressure cookers. The potential risk involved in using such electric pressure cookers creates inconvenience for users because they often feel unsafe to operate the electric pressure cooker during the cooking process, or tend to stay away from the pressure cooker while the food is being prepared, and thus cannot fully enjoy the use of their electric pressure cookers.

Therefore, there remains a need for improved safety features for electric pressure cookers.

SUMMARY OF THE INVENTION

The present invention overcomes the shortcomings of the prior art electric pressure cookers and lids by providing improvements to the existing electric pressure cookers and the lids thereof. The present invention provides a safety lid that is constructed and arranged to interrupt, block, or redirect a burst of hot steam/liquid emanating from an electric pressure cooker, thereby protects a nearby user from such hazardous spurt. The present invention further provides an electric pressure-cooking appliance equipped with such a safety lid.

In accordance with one aspect of the present disclosure, there is provided a lid for an electric pressure cooker, the electric pressure cooker comprising a housing, an outer pot received in the housing, an inner pot removably disposed within the outer pot, the lid comprising: a lid body for covering the inner pot; an inner rim extending from the lid body for lockably engaging with an upper rim of the outer pot; and an outer rim extending from the lid body and being substantially concentric with the inner rim; wherein the inner rim and the outer rim are spaced apart to define an annular groove for receiving an upper rim of the housing or a portion thereof.

In accordance with another aspect of the present disclosure, there is provided an electric pressure cooking appliance comprising: a housing; an outer pot received in the housing; an inner pot removably disposed within the outer pot; and a lid comprising a lid body for covering the inner pot; an inner rim extending from the lid body for lockably engaging with an upper rim of the outer pot; and an outer rim extending from the lid body and being substantially concentric with the inner rim; wherein the inner rim and the outer rim are spaced apart to define an annular groove for receiving an upper rim of the housing or a portion thereof.

In accordance with another aspect of the present disclosure, there is provided a lid assembly for an electric pressure cooker, the electric pressure cooker comprising a housing, an outer pot received in the housing, an inner pot removably disposed within the outer pot, the lid assembly comprising: (1) a first part comprising a lid body for covering the inner pot and an inner rim extending from the lid body for lockably engaging with an upper rim of the outer pot, the inner rim being integrally formed with the lid body; and (2) a second part comprising an outer rim extending from the lid body and being substantially concentric with the inner rim, wherein the inner rim and the outer rim are spaced apart to define an annular groove for receiving an upper rim of the housing or a portion thereof, and wherein the outer rim is removably attachable to the first part.

Other features and advantages of the present invention will become apparent from the following detailed description and the accompanying drawings, which illustrate, by way of example, the principles of the invention.

BRIEF DESCRIPTION OF THE DRAWINGS

By way of example only, preferred embodiments of the present invention are described hereinafter with reference to the accompanying drawings, wherein.

DETAILED DESCRIPTION OF THE INVENTION

Referring to FIGS. 1-8, an example embodiment of the present invention is illustrated as an electric pressure cooking appliance 100 comprising a housing 106; an outer pot 112 received in the housing 106; an inner pot 114 removably disposed within the outer pot 112; and a lid 116. The inner pot 114 is a cooking vessel or container for receiving food items to be cooked under pressure, and can be inserted into the outer pot 112 for cooking food and removed therefrom for cleaning, storage or other use. Preferably, the inner pot 114 is made of suitable metal materials including stainless steel, and the outer pot 112 is made of metals, alloys, or other suitable rigid materials.

Figure 1:
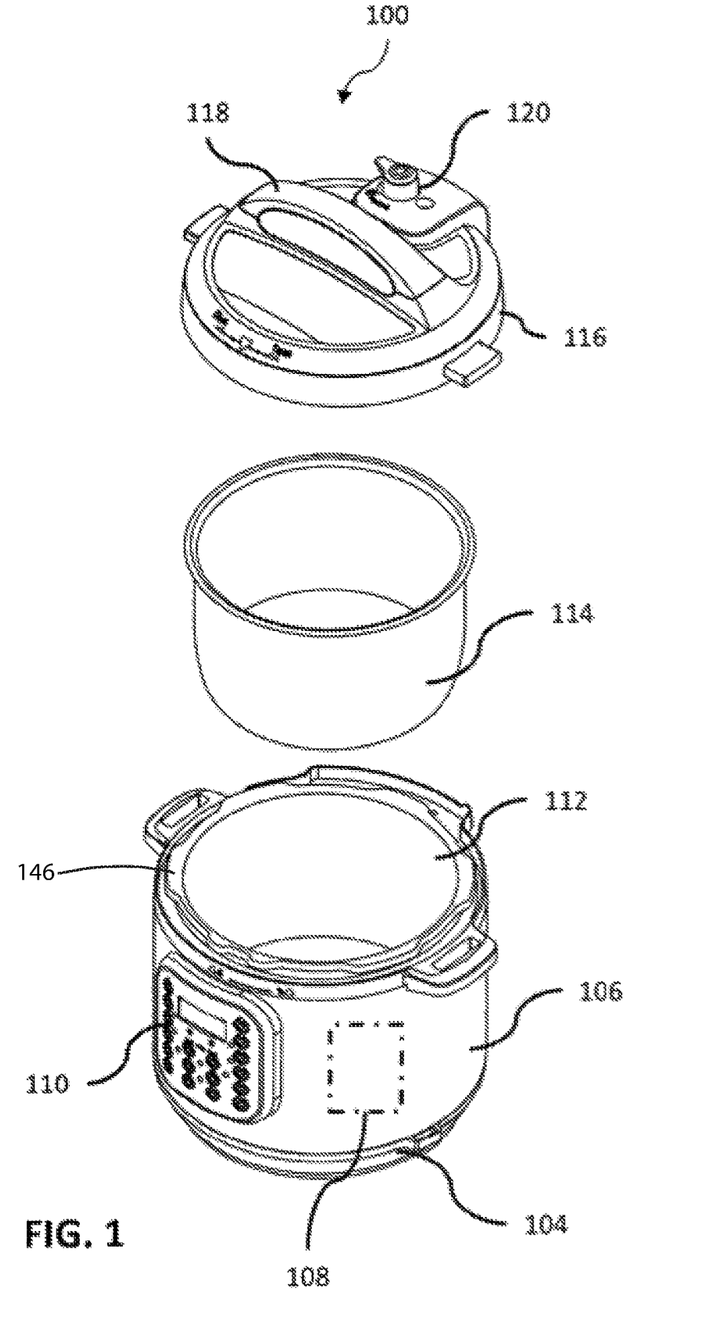
FIG. 1 is an exploded perspective view illustrating a pressure-cooking appliance in accordance with an example embodiment of the present disclosure.

The housing 106 includes a base unit 104 for supporting a periphery sidewall of the housing 106. The base unit 104, the interior sidewall of housing 106 and the outer pot 112 generally define at least one internal chamber space 102 which may at least partially receive and support a cooking controller 108 for controlling the various components of the pressure cooking appliance 100 and operations thereof. The pressure cooking appliance 100 may include a control panel 110 as a user interface for controlling the operations of the pressure cooking appliance 100, such as cooking mode, cooking pressure, cooking temperature, cooking time, start/stop, and other controls known in the art. One or more other components of the pressure-cooking appliance 100 may be at least partially disposed or installed within the internal chamber space 102 and the space between the outer pot 112 and the inner pot 114. For example, a heating element 180 can be provided under a bottom wall of the inner pot 114. The heating element 180 can be operably coupled to a source of electric power 190 located in the internal chamber 102. In addition, various sensors in communication with the cooking controller 108 can be positioned at various locations of the pressure-cooking appliance 100 to measure or monitor pressure, temperature, weight, and other conditions to facilitate the cooking operations.

Figure 2:
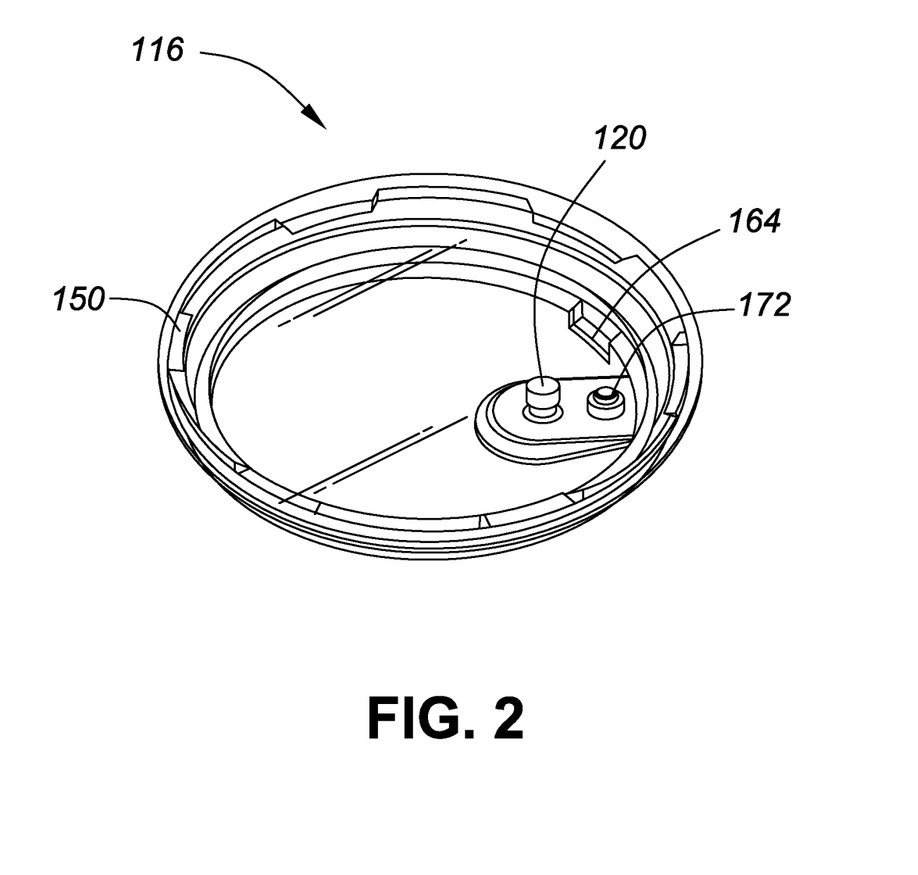
FIG. 2 is a perspective view of an underside of a lid in accordance with an example embodiment of the present disclosure.
Figure 3:
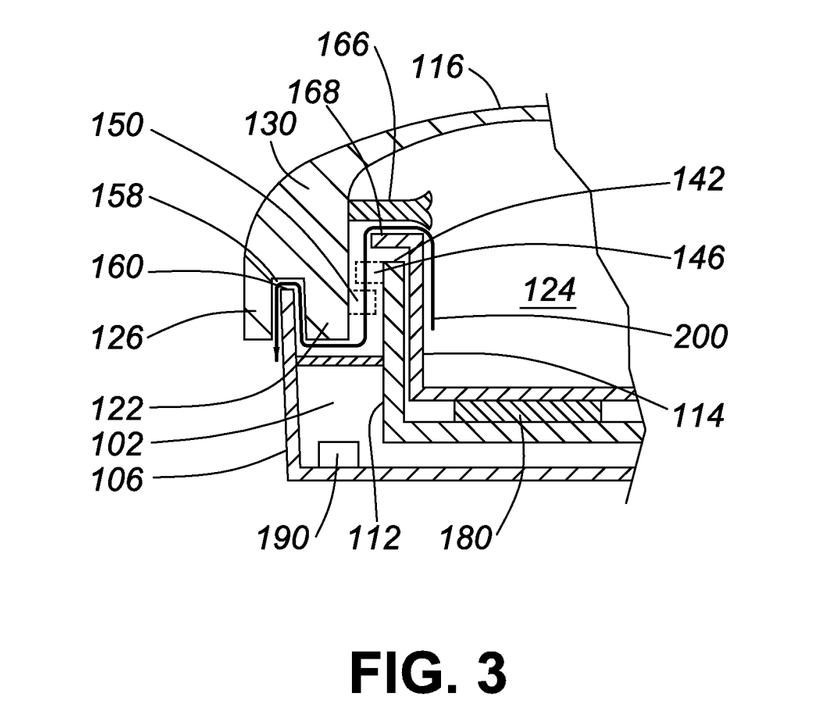
FIG. 3 is a schematic representation of a partial sectional side view illustrating an example embodiment of a pressure-cooking appliance when cooking pressure reaches or exceeds a maximum safety threshold, in accordance with the present disclosure.
Figure 4:
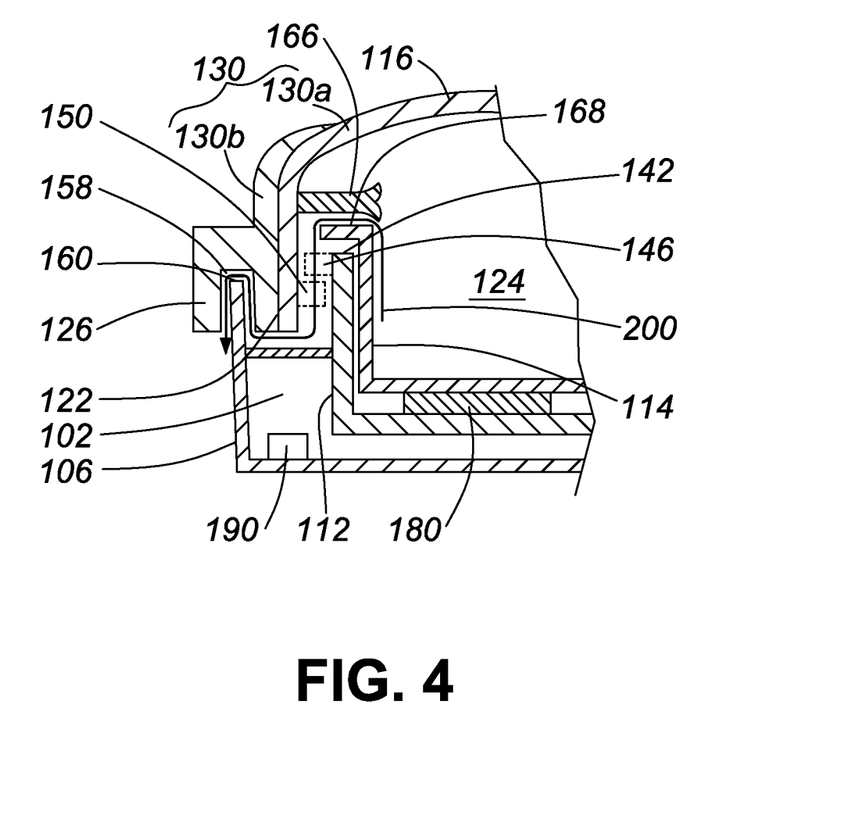
FIG. 4 is a schematic representation of a partial sectional side view illustrating the pressure-cooking appliance of FIG. 3 with an alternative lid configuration.
Figure 5:
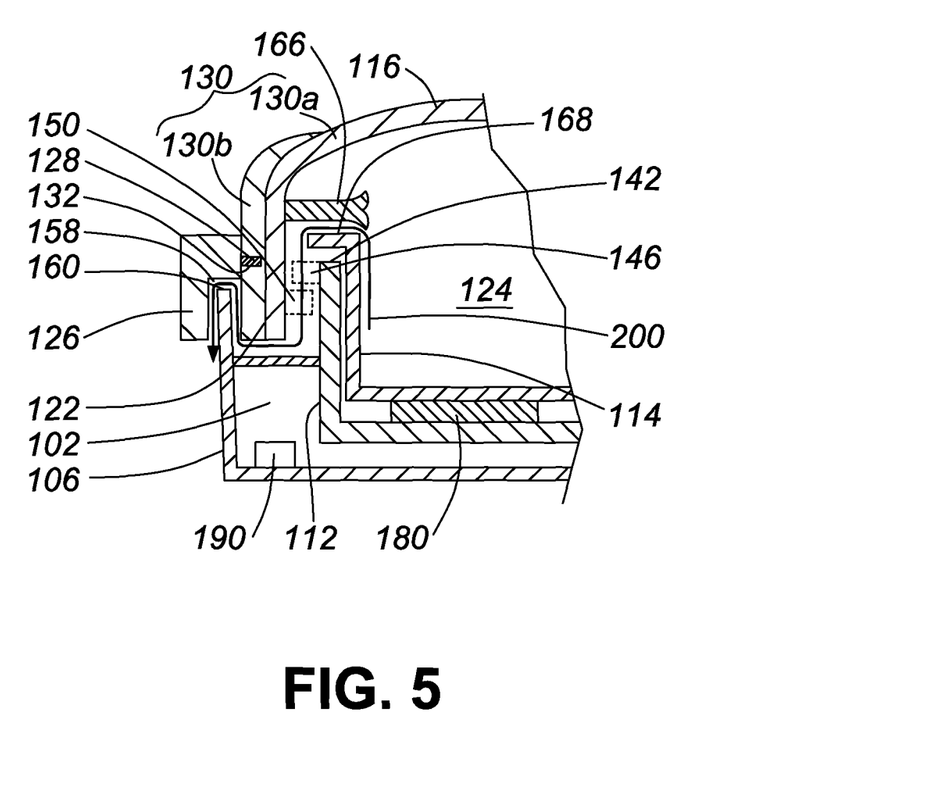
FIG. 5 is a schematic representation of a partial sectional side view illustrating another example embodiment of a pressure-cooking appliance with a further alternative lid configuration.
Figure 6:
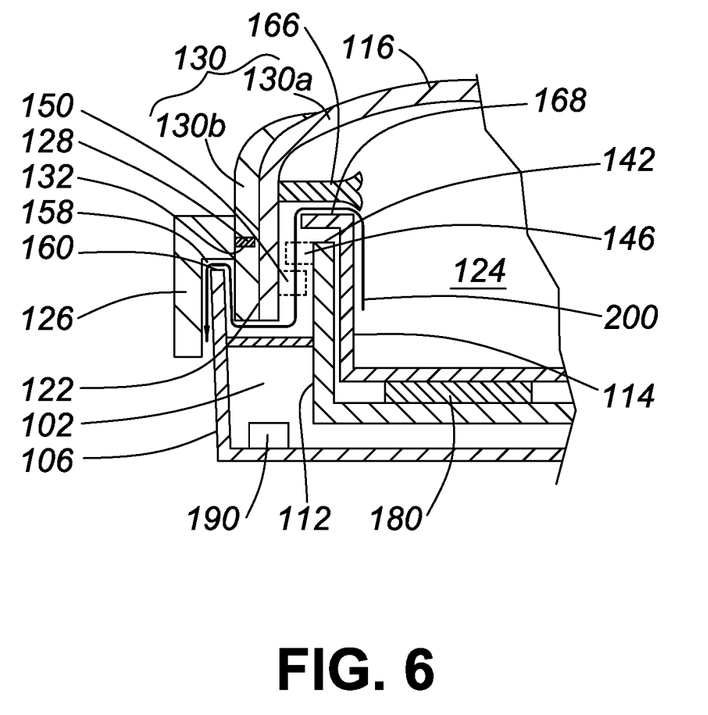
FIG. 6 is a schematic representation of a partial sectional side view illustrating another example embodiment of a pressure-cooking appliance with a further alternative lid configuration.
Figure 7:
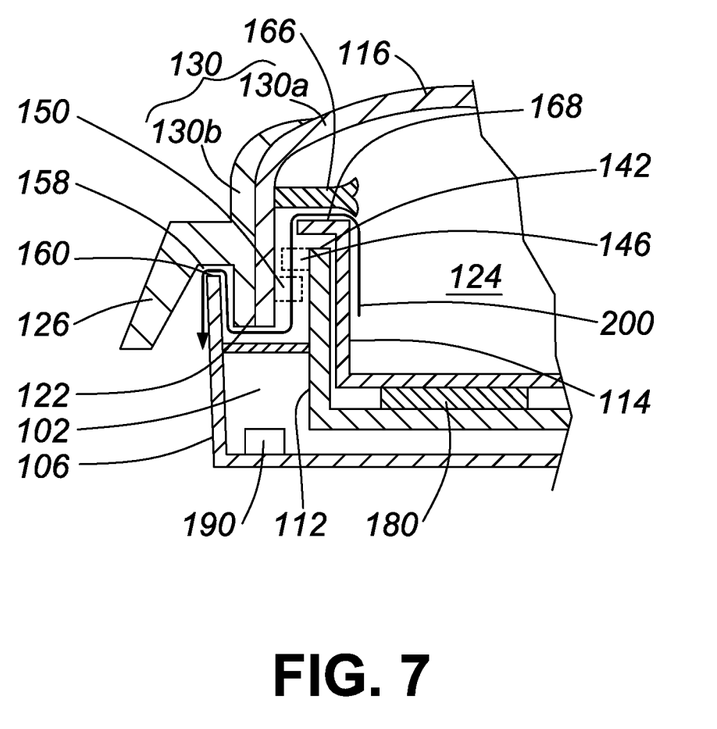
FIG. 7 is a schematic representation of a partial sectional side view illustrating another example embodiment of a pressure-cooking appliance with a further alternative lid configuration.
Figure 8:
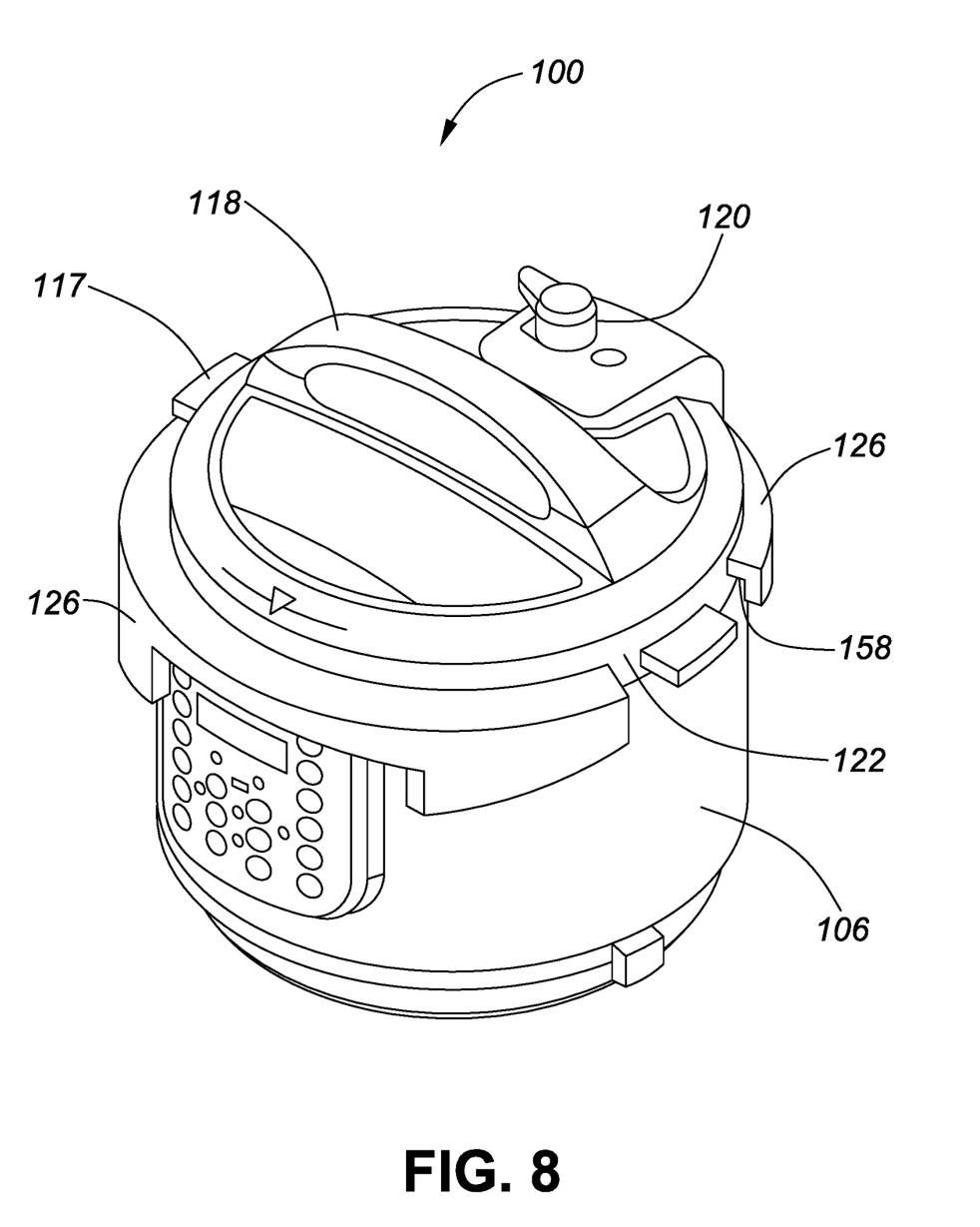
FIG. 8 is a schematic representation of a perspective view illustrating another example embodiment of a pressure-cooking appliance with a further alternative lid configuration.

Still referring to FIGS. 1-4, in an example embodiment of the present invention, the lid 116 comprises a lid body portion 130, an inner rim 122, and an outer rim 126. The lid body 130 is generally dome shaped and configured and dimensioned to substantially cover the opening of the inner pot 114. In some embodiments the lid body portion 130 may have configurations other than a dome, such as a concave or flat configuration. In some embodiments, the lid 116, which includes the lid body 130, the inner rim 122, and the outer rim 126, is formed as a unitary, or one-piece construction, as shown in FIG. 3. In such embodiments, the lid 116 is preferably made of high strength, lightweight, high heat and pressure resistant material, including metals, alloys, and other suitable materials. In some embodiments, as shown in FIG. 4, the lid body 130 generally includes an interior wall 130a and an exterior wall 130b. The interior wall 130a and exterior wall 130b of the lid body 130 can be constructed with the same material or different materials. For example, at least a part of the exterior wall 130b of the lid body 130 can be made of plastic or other suitable materials, while the interior wall 130a of the lid body 130 preferably is made of stainless steel or other suitable rigid metals or alloys. The interior wall 130a may or may not be further protected by an exterior cover, as known in the art. Further, the lid body 130 may have varying thickness between surfaces of interior and exterior walls 130a and 130b, and the interior and exterior walls 130a and 130b of the lid body 130 may have same or different configurations, sizes, curvatures, and/or shapes. In some embodiments, at least a portion of the exterior wall 130b of the lid body 130 has a diameter that is larger than a diameter of the periphery sidewall of the housing 106. In some embodiments, the lid body 130 and/or the exterior wall 130b thereof is constructed or integrally formed from one or more components.

In some embodiments, at least one seal support member 164 is provided on an interior wall of the lid body 130, for supporting a sealing ring 166. The sealing ring 166 is configured and arranged to sealingly engage with an upper rim 168 of the inner pot 114 when the lid 116 is securely placed in a locked position to cover the outer pot 112 and the inner pot 114. Thus, upon secure locking of the lid 116 with the outer pot 112, a substantially airtight cooking space 124 is defined by the lid body 130, the sealing ring 166, and the inner pot 114. The sealing ring 166 may take any suitable form known in the art. By way of example, it may have a cross section as shown in FIG. 3, wherein the sealing ring 166 includes a lower tip and an upper tip relative to the inner pot 114.

In some embodiments, as shown in FIG. 1, a pressure regulator device or safety valve 120 and a float valve 172 are disposed on the lid 116. The pressure regulator 120 may comprise a weight valve, which under normal operations will rise and release the pressure within the inner pot 114 if a predetermined maximum safety pressure has been reached or exceeded. The pressure regulator 120 may include a switch movable between a sealing position and a venting position. Generally, the switch should be in sealing position during the cooking process. After the pressure-cooking cycle is completed, in order to quickly release pressure, a user may turn the switch to the venting position, and the pressure regulator 120 will open its release valve to allow a quick release of the steams.

In some embodiments, as shown in FIGS. 2-4, the inner rim 122 is generally an annular flange member extending or transitioning from the lid body 130 or a part thereof for lockably engaging with an upper rim 142 of the outer pot 112. Preferably, the inner rim 122 is constructed as an integral part of the lid 116 or lid body 130, for example, by way of molding, welding, glue, fastening, or any similar means known in the art. In some embodiments, the locking mechanism between the inner rim 122 and the outer pot 112 is implemented by way of locking flanges. In these embodiments, a plurality of spaced apart, radially extending pot flanges 146 are formed along a periphery of the upper rim 142 of the outer pot 112. Correspondingly, a plurality of spaced apart, radially extending lid flanges 150 are formed near an inner periphery of an end of the inner rim 122. The flanges 146 and flanges 150 are arranged to generally extend toward each other when the lid 116 covers the outer pot 112. A user may rotate the lid 116 via a lid handle 118 to move the lid 116 from an unlocked position, wherein the flanges 146 and flanges 150 are not aligned, to a locked position, wherein the flanges 146 and flanges 150 are aligned in a substantially overlaying manner so that the lid 116 cannot be lifted from the outer pot 112 in this locked position. While locking flanges are described herein, other locking mechanisms or arrangements based on the same or similar principles can be used instead, as a person of ordinary skill in the art would appreciate.

In some embodiments, as shown in FIGS. 2-8, the outer rim 126 is generally an annular flange member extending or transitioning from the lid body 130 or a part thereof. The outer rim 126 or a part thereof is substantially concentric with the inner rim 122 in reference to the lid body 130. Preferably, the outer rim 126 or a portion thereof is generally extending from the lid body 130 in a direction that is substantially parallel with the inner rim 122. In some other embodiments, as shown in FIG. 4, a part of the outer rim 126 extends from the lid body 130 in a direction that is substantially perpendicular to a direction in which the inner rim 122 extends from the lid body 130, while another part of the outer rim 126 extends from the lid body 130 in a direction that is substantially parallel with that of the inner rim 122. In some other embodiments, the outer rim 126 extends from the lid body 130 at an angle to the inner rim 122.

The inner rim 122 and the outer rim 126 are spaced apart to define an annular area 158 for receiving an upper rim 160 of the housing 106 or a portion of the upper rim 160 of the housing 106. In the exemplary embodiments showed in FIGS. 3 and 4, the annular area 158 take the form of a groove or channel 158 for receiving an upper rim 160 of the housing 106 or a portion of the upper rim 160 of the housing 106. As such, when the lid 116 is securely locked with the outer pot 112, the outer rim 126 redirects and extends a gap between an exterior wall of the inner rim 122 and an upper portion of an interior periphery wall of the housing 106, so that the gap continues to run between the upper rim 160 of the housing 106 and an interior wall of the outer rim 126. In some embodiments, the gap continues to run between an exterior periphery wall of the housing 106 and an interior wall of the outer rim 126. Thus, in some embodiments, the groove 158 may be devoid of an exterior sidewall and may be open on one side, particularly when the outer rim 126 extends from the lid body 130 at an angle to the inner rim 122. In some embodiments, as shown in FIG. 2, the outer rim 126 is configured to substantially completely surround an exterior periphery of the inner rim 122. In some embodiments, the outer rim 126 is configured to partially surround an exterior periphery of the inner rim 122.

Preferably, the groove 158 is configured to have sufficient width, depth, and/or clearance to accommodate the upper rim 160 of the housing 106 or a portion thereof. In some embodiments, a height of the outer rim 126 measured from a bottom of groove 158 is substantially equal to a height of the inner rim 122 measured from a bottom of groove 158. However, the outer rim 126 and the inner rim 122 may have different heights. In some embodiments, the outer rim 126 has a height that is greater than that of the inner rim 122. Advantageously, an outer rim 126 having a greater height provides better redirecting and guiding functions described herein. In some embodiments, at least one of the inner rim 122 and the outer rim 126 may have non-uniform, varying heights along a periphery thereof, to make room for other structures/components (e.g., lid fin 117 or control panel 110) on the lid 116 or the pressure-cooking appliance 100.

In some embodiments, the outer rim 126 has at least one interrupted or non-continuous section. In some embodiments, the outer rim 126 is constructed as an integral part of the lid 116 or lid body 130, for example, by way of molding, welding, glue, fastening, or any similar means known in the art. In some embodiments, the outer rim 126 is constructed as a separate component that can be removably attached to the lid 116 or the lid body 130. Such removable attachments can be realized using methods known in the art, such as snap on connections, pegs, clips, hooks, fasteners, or other similar means. For example, the outer rim 126 can be provided with a plurality of pegs or projections (128) for snug fitting with a plurality of interfacing holes or apertures (132) provided on the lid 116 or the lid body 130. In some embodiments, one or more removably attachable outer rims 126 can be independently attached to the lid 116 or lid body 130 to collectively form a larger outer rim 126, which can be continuously or non-continuously disposed around the inner rim 122 in a spaced apart and substantially concentric fashion. Advantageously, a benefit of having removable outer rim 126 is that it can be easily cleaned and replaced. Another benefit is that the outer rim 126 may be attached to the lid 116 during cooking, and removed to be stored away thereafter.

Advantageously, the lid 116 described herein provides further safety for the pressure-cooking appliance 100 when other safety measures fail. For example, the sealing ring 166 may have undetected imperfection or leakage; the safety valve 120 may be clogged due to lack of regular cleaning and maintenance. Furthermore, when the safety valve 120 is blocked or malfunctioning, the pressure within the cooking vessel may rapidly increase to reach or exceed a predetermined maximum safety threshold. It has been observed that, such increased pressure, which may approach or exceed about 160 kPa or 23 psi, may cause the lid 116 and the inner pot 114 to expand at least in part in substantially opposite directions, and as such will cause the sealing ring 166 to be separated from or disengaged with the upper rim 168 of the inner pot 114. It has been observed that, as a result of an imperfection or failure in at least one of the sealing ring 166 and safety valve 120, hot steam/liquid may burst out along one or more pathways 200 via the upper rim of the inner pot 114. In addition, even if both the sealing ring 166 and the safety valve 120 work properly, if the increase in pressure occurs in a very short period of time, the safety valve 120 may not be able to timely release the excess pressure, and the dangerous outbursts may emit from a gap between the sealing ring 166 and the upper rim 168 of the inner pot 114, as noted above. By virtue of lid 116 disclosed herein, the steam/liquid bursts will be interrupted, blocked, and redirected downwardly toward a supporting surface of the pressure-cooking appliance 100, as opposed to discharging substantially horizontally toward nearby people or animals. Therefore, the pressure-cooking appliance 100 equipped with the lid 116 protects a nearby user from hazardous spurts. A further advantage of the lid 116 is that the hot bursts can now be safely released to the outside of the pressure-cooking appliance 100 without damaging the electronic components and/or control circuitry located in the internal chambers of the cooker 100.

The lid 116 described herein can be constructed as a lid assembly for use with the pressure-cooking appliance 100. In some embodiments, the lid 116 is removably connectable to the pressure-cooking appliance 100 or the housing 106. For example, as shown in FIG. 1, the lid 116 may include one or more lid fins configured to be received by one or more lid fin slots disposed on the housing 106. In some embodiments, the lid assembly includes a first part comprising the lid body 130 and the inner rim 122 integrally formed with the lid body 130, and a second part comprising the outer rim 126 that is removably attachable to the first part.

Although the present invention has been described in considerable detail with reference to certain preferred embodiments thereof, other embodiments and modifications are possible. Therefore, the scope of the appended claims should not be limited by the preferred embodiments set forth in the examples, but should be given the broadest interpretation consistent with the description as a whole.

What is claimed is:

1. A lid for an electric pressure cooker, the electric pressure cooker comprising a housing, an outer pot received in the housing, an inner pot removably disposed within the outer pot, the lid comprising:
    a lid body for covering the inner pot;
    an inner rim extending from the lid body for lockably engaging with an upper rim of the outer pot;
    an outer rim extending from the lid body and being substantially concentric with the inner rim; and
    wherein the inner rim and the outer rim are spaced apart to define an annular groove for receiving an upper rim of the housing or a portion thereof;
    wherein the inner rim is receivable between the outer pot and the housing; and
    wherein the outer pot, the inner rim, the housing, and the outer rim define a steam pathway for directing and discharging excess steam outside of the electric pressure cooker along a first downward direction between the outer pot and the inner rim, a second upward direction between the inner rim and the housing, and a third downward direction between the housing and the outer rim.

2. The lid of claim 1, wherein the outer rim is constructed and arranged to be removably attachable to at least one of the lid body and the inner rim.

3. The lid of claim 1, wherein the outer rim is configured to partially surround an exterior periphery of the inner rim.

4. The lid of claim 1, wherein the outer rim has at least one interrupted or non-continuous section.

5. The lid of claim 1, wherein the outer rim is configured to have varying heights measured from a bottom of the annular groove along a periphery of the outer rim.

6. The lid of claim 1, wherein the outer rim is at an angle to the inner rim.

7. The lid of claim 1, wherein the outer rim has a height that is greater than that of the inner rim.

8. A lid assembly for an electric pressure cooker, the electric pressure cooker comprising a housing, an outer pot received in the housing, an inner pot removably disposed within the outer pot, the lid assembly comprising:
    a first part comprising a lid body for covering the inner pot and an inner rim extending from the lid body for lockably engaging with an upper rim of the outer pot, the inner rim being integrally formed with the lid body; and
    a second part comprising an outer rim extending from the lid body and being substantially concentric with the inner rim, wherein the inner rim and the outer rim are spaced apart to define an annular groove for receiving an upper rim of the housing or a portion thereof, and wherein the outer rim is removably attachable to the first part;
    wherein the inner rim is receivable between the outer pot and the housing; and
    wherein the outer pot, the inner rim, the housing, and the outer rim define a steam pathway for directing and discharging excess steam outside of the electric pressure cooker along a first downward direction between the outer pot and the inner rim, a second upward direction between the inner rim and the housing, and a third downward direction between the housing and the outer rim.

9. An electric pressure-cooking appliance comprising:
    a housing;
    an outer pot received in the housing;
    an inner pot removably disposed within the outer pot; and
    a lid comprising a lid body for covering the inner pot, an inner rim extending from the lid body for lockably engaging with an upper rim of the outer pot, and an outer rim extending from the lid body and being substantially concentric with the inner rim, wherein the inner rim and the outer rim are spaced apart to define an annular groove for receiving an upper rim of the housing or a portion thereof; wherein the inner rim is receivable between the outer pot and the housing; and wherein the outer pot, the inner rim, the housing, and the outer rim define a steam pathway for directing and discharging excess steam outside of the electric pressure cooker along a first downward direction between the outer pot and the inner rim, a second upward direction between the inner rim and the housing, and a third downward direction between the housing and the outer rim.

10. The electric pressure-cooking appliance of claim 9, wherein the outer rim is constructed and arranged to be removably attachable to at least one of the lid body and the inner rim.

11. The electric pressure-cooking appliance of claim 9, wherein the outer rim is configured to partially surround an exterior periphery of the inner rim.

12. The electric pressure-cooking appliance of claim 9, wherein the outer rim has at least one interrupted or non-continuous section.

13. The electric pressure-cooking appliance of claim 9, wherein the outer rim is configured to have varying heights measured from a bottom of the annular groove along a periphery of the outer rim.

14. The electric pressure-cooking appliance of claim 9, wherein the outer rim has a height that is greater than that of the inner rim.

15. The electric pressure-cooking appliance of claim 9, wherein the outer rim is at an angle to the inner rim.

* * * * *